(12) United States Patent
Suhling

(10) Patent No.: US 10,858,028 B2
(45) Date of Patent: Dec. 8, 2020

(54) AXLE KIT APPARATUS

(71) Applicant: Robert James Suhling, Waukegan, FL (US)

(72) Inventor: Robert James Suhling, Waukegan, FL (US)

( * ) Notice: Subject to any disclaimer, the term of this patent is extended or adjusted under 35 U.S.C. 154(b) by 294 days.

(21) Appl. No.: 16/012,870

(22) Filed: Jun. 20, 2018

(65) Prior Publication Data
US 2019/0389500 A1    Dec. 26, 2019

(51) Int. Cl.
*A47K 1/04* (2006.01)
*B62B 5/00* (2006.01)
*B25H 1/06* (2006.01)
*F16M 11/42* (2006.01)

(52) U.S. Cl.
CPC ............. *B62B 5/0083* (2013.01); *B25H 1/06* (2013.01); *F16M 11/42* (2013.01)

(58) Field of Classification Search
CPC ......... B62B 5/0083; B25H 1/06; F16M 11/42
See application file for complete search history.

(56) References Cited

U.S. PATENT DOCUMENTS

| | | | |
|---|---|---|---|
| 894,131 A * | 7/1908 | Frederick | |
| 2,634,169 A * | 4/1953 | Martin | B60B 35/14 301/132 |
| 3,954,155 A * | 5/1976 | Guidara | E06C 1/20 182/20 |
| 4,860,807 A * | 8/1989 | Vacchiano | B23D 47/025 144/286.1 |
| 4,969,496 A * | 11/1990 | Romans | B23D 47/025 108/132 |
| 5,284,005 A * | 2/1994 | Jacobi | B68C 1/147 54/44.2 |
| 5,778,953 A * | 7/1998 | Braddock | B23D 47/025 144/286.1 |
| 6,926,371 B1 * | 8/2005 | Gagnon | B60B 35/04 301/124.1 |
| 7,458,403 B2 * | 12/2008 | Radermacher | B23D 47/025 144/286.1 |
| 8,463,765 B2 | 6/2013 | Lesavich | |
| 9,037,564 B2 | 5/2015 | Lesavich et al. | |
| 9,137,250 B2 | 9/2015 | Lesavich et al. | |
| 9,361,479 B2 | 6/2016 | Lesavich et al. | |
| 9,545,734 B2 | 1/2017 | Suhling | |
| 9,569,771 B2 | 2/2017 | Lesavich et al. | |
| 9,682,454 B2 | 6/2017 | Suhling | |
| 10,100,872 B1 * | 10/2018 | Rode | F16B 39/12 |
| 10,245,653 B2 | 4/2019 | Suhling | |
| 10,336,127 B1 | 7/2019 | Suhling | |
| 2011/0208710 A1 | 8/2011 | Lesavich | |

(Continued)

*Primary Examiner* — Amy J Sterling
(74) *Attorney, Agent, or Firm* — Lesavich High-Tech Law Group, S.C.

(57) ABSTRACT

An axle kit apparatus for increasing the mobility of foldable sawhorse stands while allowing the tires used to be customizable. The invention consists of an axle that connects all of the pieces together. It is mounted with two fasteners that pass through the axle. Two spindles thread into the axle to allow them to be removable. Two objects with threaded apertures lock the spindles in place as well as provide the necessary preload to the bearing races of any tire used. The invention allows for any size spindle and tires to be used as long as the spindle can thread into the axle.

7 Claims, 12 Drawing Sheets

(56) References Cited

U.S. PATENT DOCUMENTS

| | | |
|---|---|---|
| 2012/0006234 A1* | 1/2012 | Marshall .................. B25H 1/04 108/12 |
| 2012/0278622 A1 | 11/2012 | Lesavich et al. |
| 2014/0189792 A1 | 7/2014 | Lesavich et al. |
| 2015/0298273 A1 | 10/2015 | Suhling |
| 2015/0306784 A1 | 10/2015 | Suhling |
| 2015/0379301 A1 | 12/2015 | Lesavich et al. |
| 2016/0321654 A1 | 11/2016 | Lesavich et al. |
| 2018/0043439 A1 | 2/2018 | Suhling |
| 2019/0381614 A1 | 12/2019 | Suhling |
| 2019/0389500 A1 | 12/2019 | Suhling |
| 2020/0001495 A1 | 1/2020 | Suhling |

* cited by examiner

AXLE KIT APPARATUS

FIELD OF THE INVENTION

The present invention relates generally to the mobility of miter saw stands, and more specifically, it relates to providing an axle for tires to freely rotate so that a previously stationary foldable sawhorse stand can be rolled around for ease of transportation.

DESCRIPTION OF THE PRIOR ART

There are many different wheel kits available to make a foldable sawhorse stand mobile. Typically, a wheel kit has an axle, two wheels, and mounting hardware. The foldable sawhorse stand gets drilled according to the location of the mounting holes on the axle, and then it is fixed to the stand by use of the mounting hardware. Finally, the wheels are attached to the axle and the stand is mobile.

The main problem with said prior art is the inability to change what wheels are used. The axle is typically one unit, with the mounting section and spindles permanently attached to each other. This makes mounting a different wheel onto the wheel kit very difficult, or even impossible. With so many different situations and terrains out there, it is important to be able to pick the right wheel for any individual's needs.

SUMMARY OF THE INVENTION

A primary object of the present invention is to provide an axle that will overcome the shortcomings of the prior art devices.

Another object is to provide an axle that allows the wheels and spindles to be removed and changed.

Another object is to provide an axle that can be attached to most folding sawhorse type stands.

Another object is to provide an axle that is durable and rugged enough to endure rough use.

Another object is to provide an axle that tires can roll smoothly on.

Another object is to provide an axle that is simple to mount and use.

Another object is to provide an axle that can apply an adjustable preload to the bearing races of the wheels.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

DESCRIPTION OF THE PREFERRED EMBODIMENT

Figure 1:
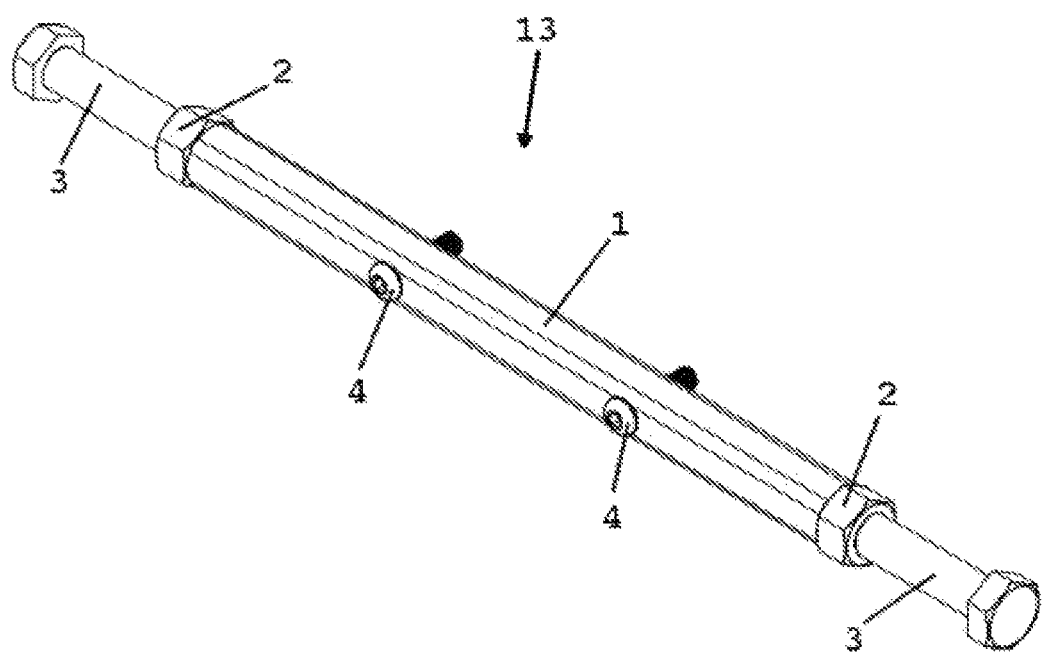
FIG. 1 is an upper perspective view of the present invention.
Figure 3:
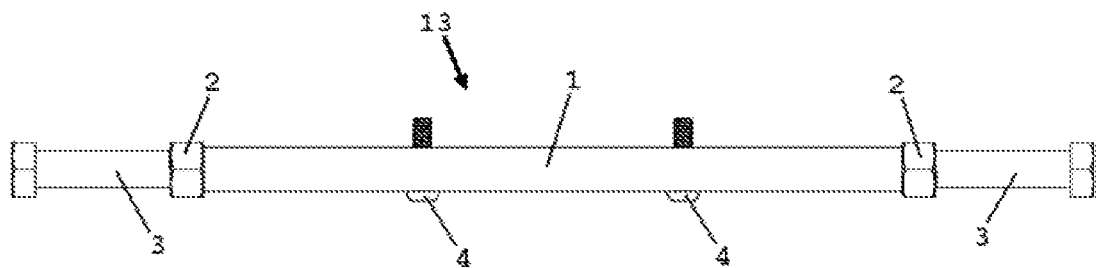
FIG. 3 is a front view of the present invention.
Figure 2:
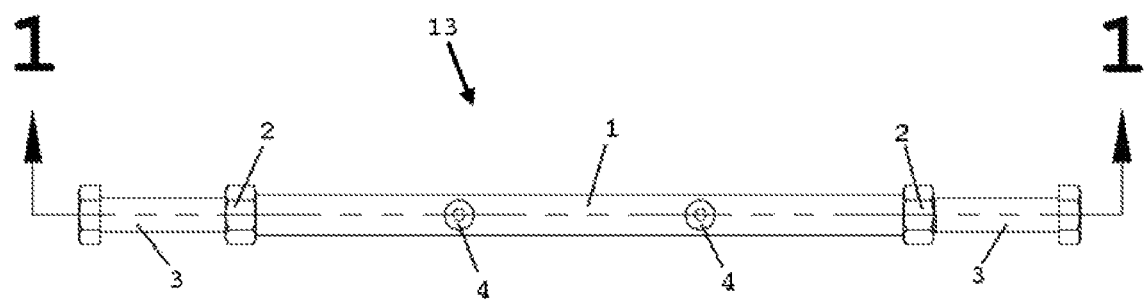
FIG. 2 is a top view of the present invention.
Figure 4:
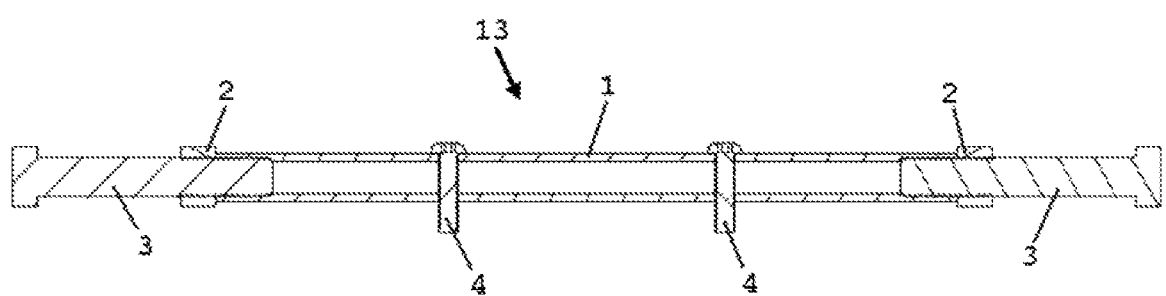
FIG. 4 is a cross sectional view taken along line 1-1 of FIG. 3.

FIGS. 1 through 4 illustrate an axle kit without wheels 13. The preferred embodiment of the present invention consists of an axle body b with a total of four apertures. Two of these apertures are located on two opposite faces of the axle body 1 and are for mounting devices 2 to pass through to be used for mounting. These mounting devices 2 rigidly support the axle body 1 and allow the invention to be mounted to most foldable sawhorse stands 11. The remaining two apertures are threaded and are located on both ends of the axle body 1. These apertures allow the spindles 3 to be affixed to the axle body 1. Preload tighteners 2 have a threaded aperture and are mounted with the spindles 3 to lock them into place.

Figure 5:
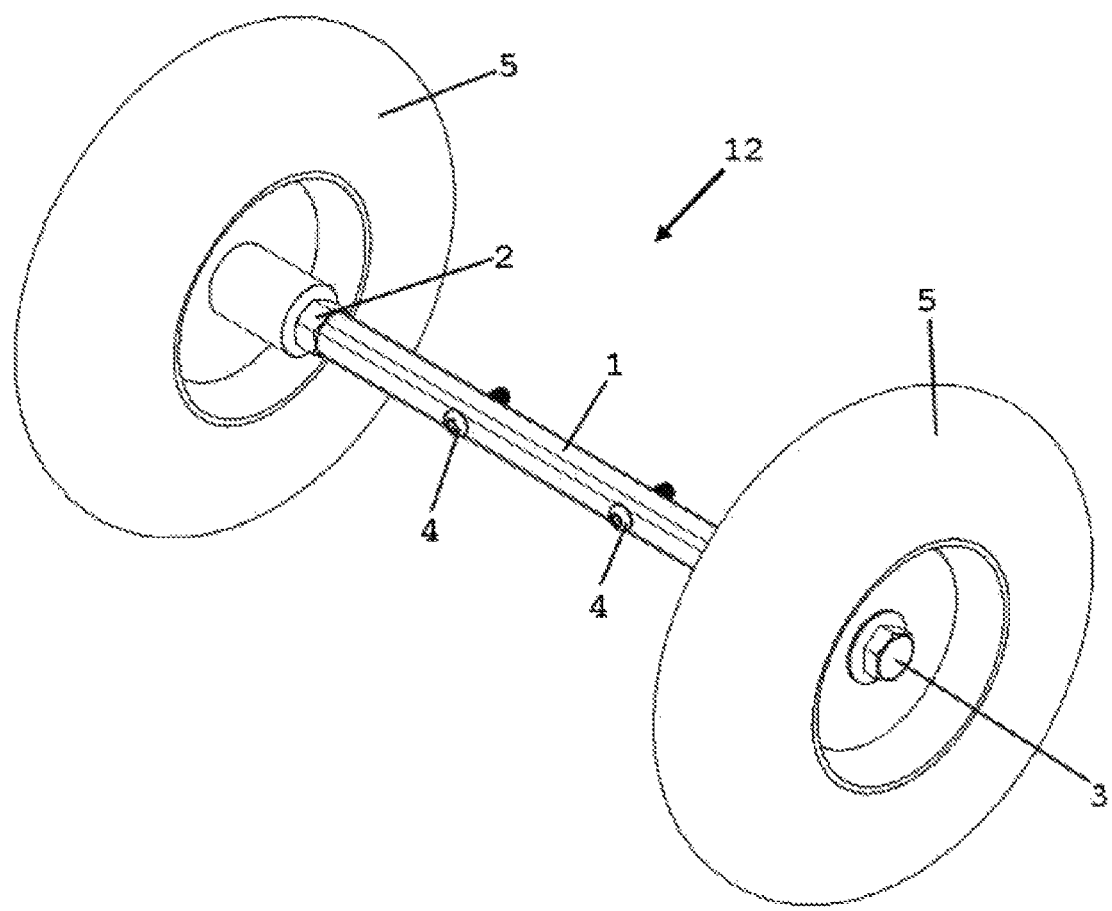
FIG. 5 is an upper perspective view of the present invention with tires attached.
Figure 6:
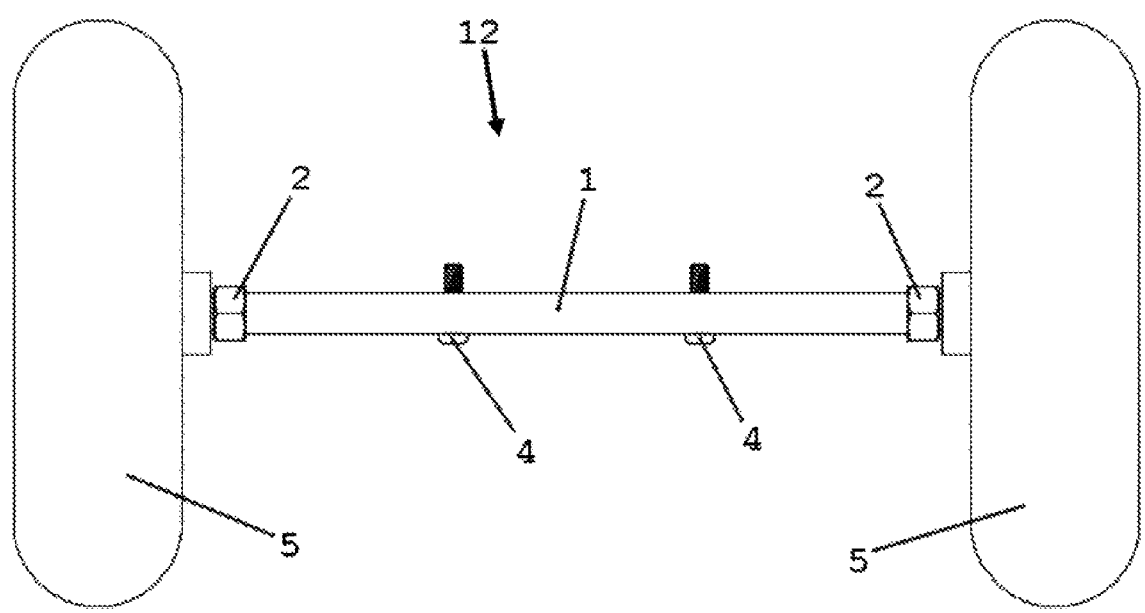
FIG. 6 is a top view of the present invention with tires attached.
Figure 7:
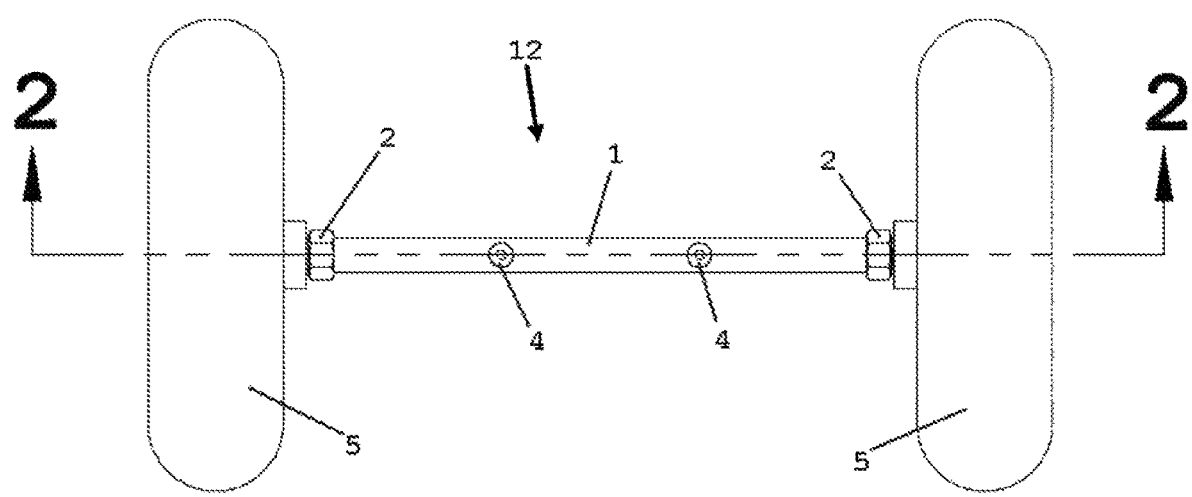
FIG. 7 is a front view of the present invention with tires attached.
Figure 8:
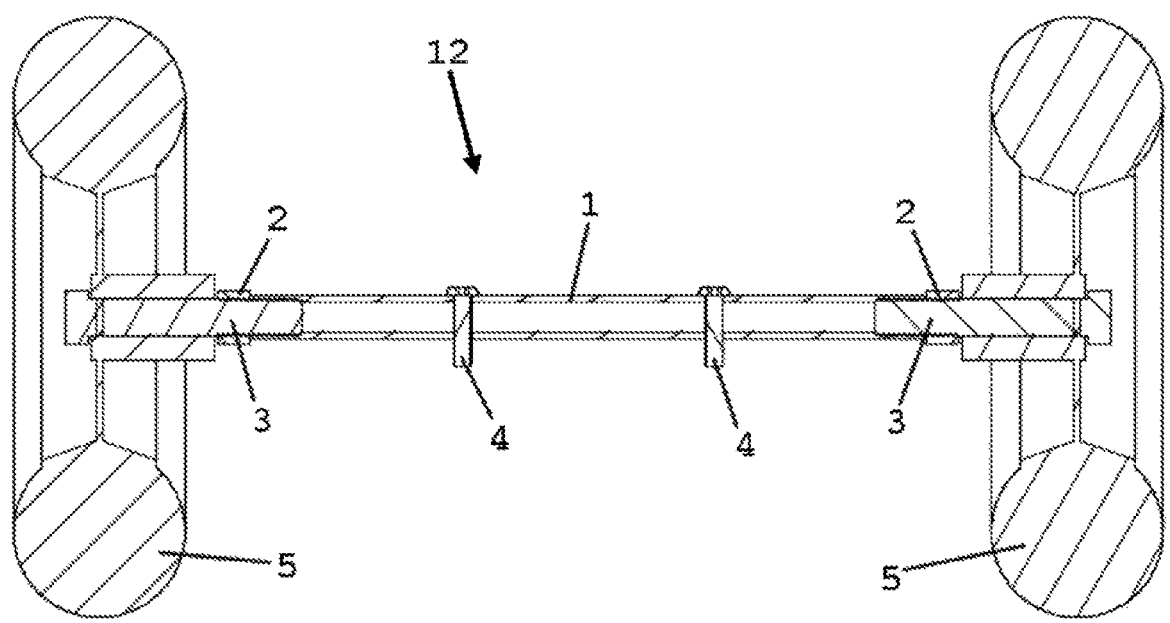
FIG. 8 is a cross sectional view taken along line 2-2 of FIG. 7.

FIGS. 5 through 8 illustrate an axle kit with wheels 12. The wheels 5 are positioned between the preload tighteners 2 and the end of the spindles 3.

Figure 9:
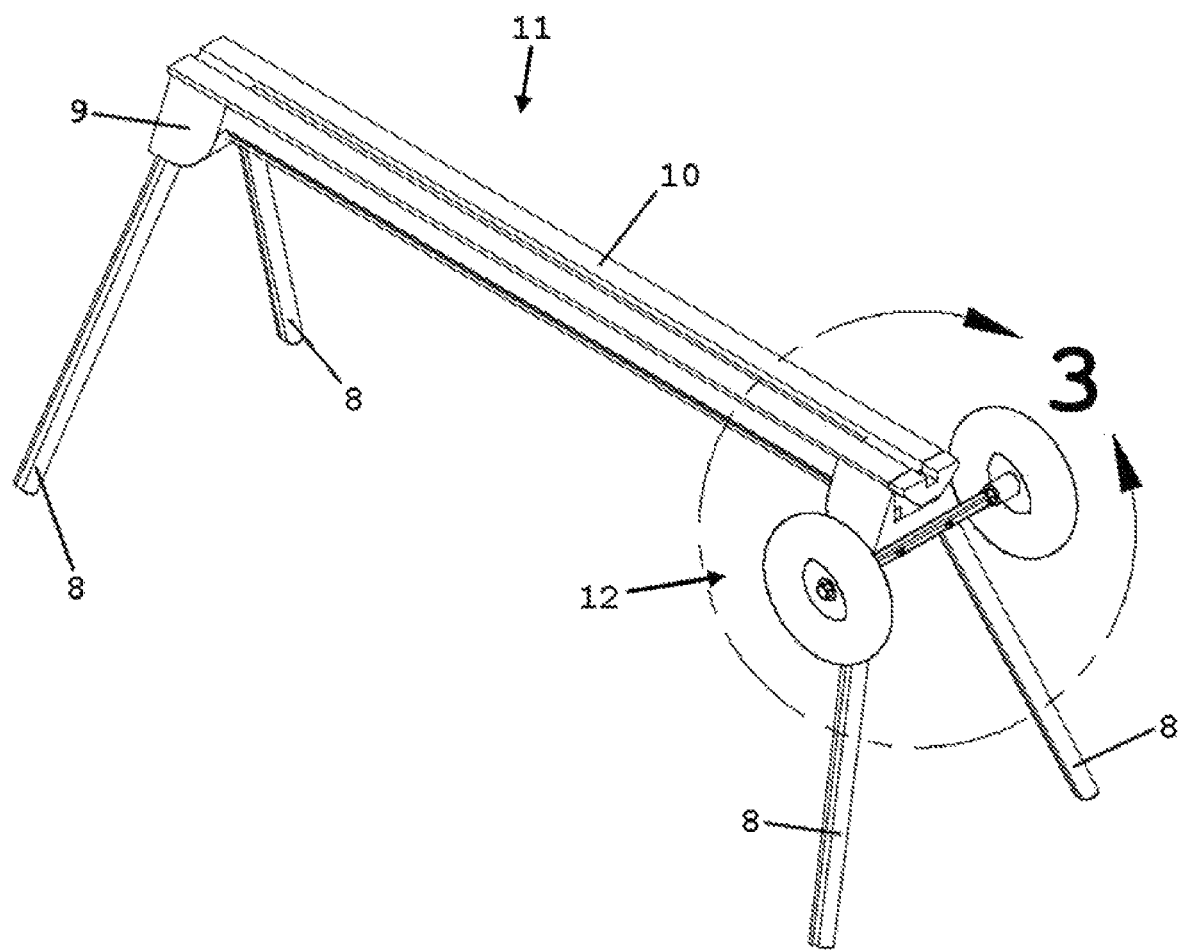
FIG. 9 is an upper perspective view of the present invention attached to a foldable sawhorse stand with tires.
Figure 10:
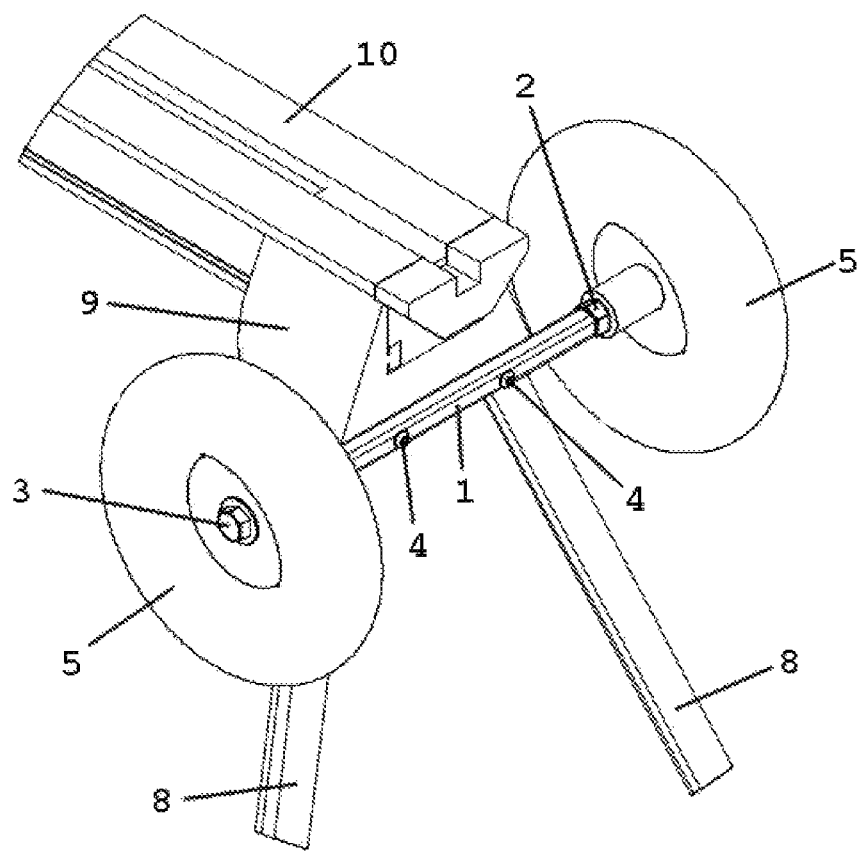
FIG. 10 is a magnified view of FIG. 9 taken from circle 3 of the attachment point between the present invention and a foldable sawhorse stand with tires.
Figure 11:
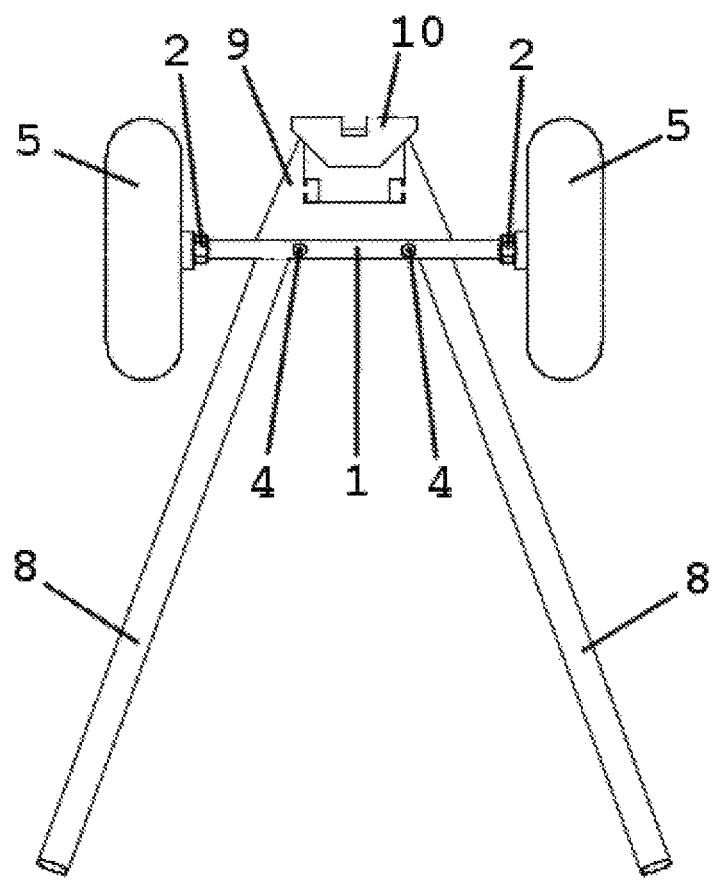
FIG. 11 is a side view of the present invention attached to a foldable sawhorse stand with tires.
Figure 12:
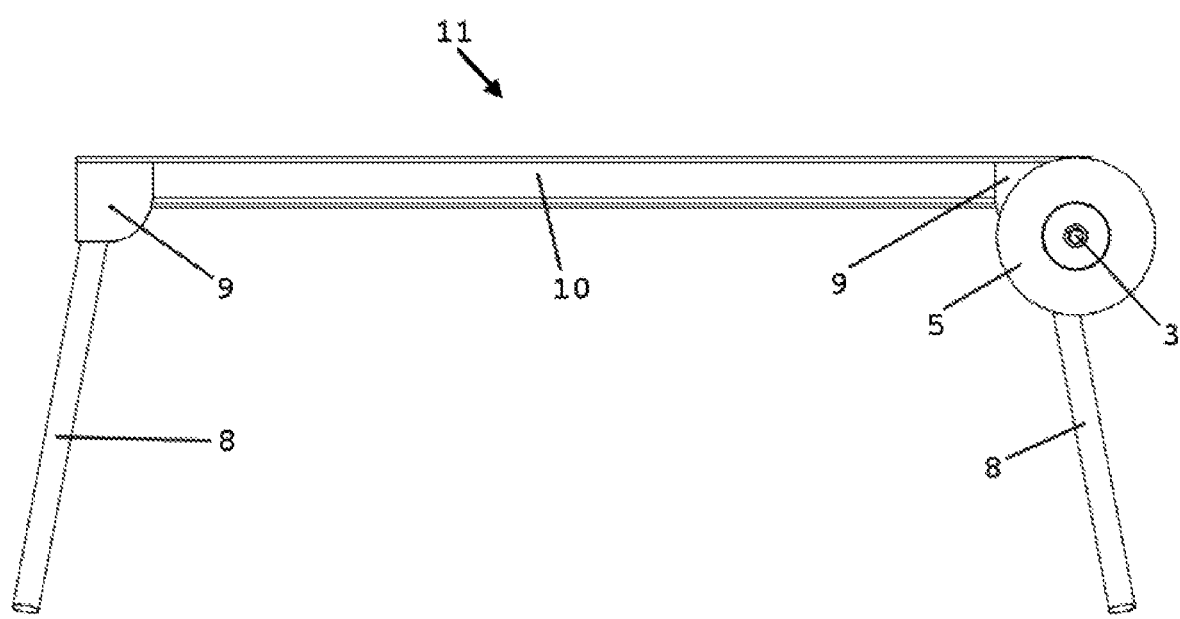
FIG. 12 is a front view of the present invention attached to foldable sawhorse with tires.
Figure 13:
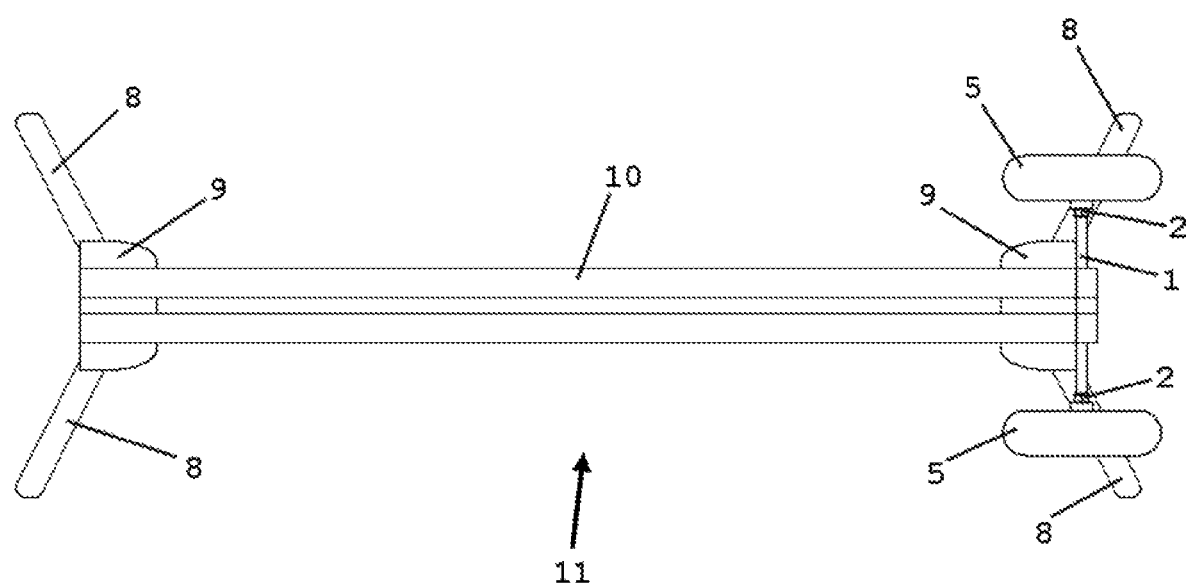
FIG. 13 is a top view of the present invention attached to a foldable sawhorse stand with tires.

FIGS. 9 through 13 illustrate an axle kit with wheels 12 mounted on a foldable sawhorse stand 11. The foldable sawhorse stand 11 typically consists of foldable legs 8, a track 10 which serves as a work surface, and mounting spots 9 which connect the legs 8 to the track 10. The axle kit with wheels 12 mounts to either mounting spot 9 on the foldable sawhorse stand 11 because it is the only location where it can both function and not interfere with any other part. The axle kit with wheels 12 is mounted through the use of the mounting devices 4. The mounting devices 4 pass through the apertures on the axle body 1 as well as user made apertures on the foldable sawhorse stand 11. They are then kept in position by threading a nut onto each of the mounting devices 4.

In use, the mounting point 9 on the foldable sawhorse stand 11 is drilled according to the location of the holes that come predrilled in the axle body 1. The user would then mount the axle body 1 to the mounting point 9 with the use of the mounting devices 4 and nuts, clamping the axle body 1 to the mounting point 9. The two wheels 5 are placed onto their spindles 3. Preload tighteners 2 are then threaded onto each spindle 3 to secure the wheel 5. The wheel 5, spindle 3, and preload tightener 2 assemblies are threaded onto either side of the axle body 1. Wrenches are used to complete the last portion of the tightening to ensure that the proper preload is set and that the spindle does not rotate. The axle kit with wheels 12 is now mounted onto the foldable sawhorse stand 11. To utilize the present invention, the user folds in the foldable legs 8 on the same side of the track 10 as the axle kit with wheels 12 and rests the wheels 5 on the ground. They would then fold in the foldable legs 8 on the opposite side of the track 10. The user can now grab the mounting point 9 that is opposite the axle kit with wheels 12 and use it as a handle while wheeling the entire unit of foldable sawhorse stand 11, axle kit with wheels 12, and any other tools mounted on track 10 around wherever they need to go. In order to change the wheels, the user would unlock the preload tighteners 2 and unscrew the spindles 3 from the axle body 1. From there, they can insert any wheel 5, spindle 3, and preload tightener 2 assembly that matches the same threading as the axle body 1.

I claim:

1. An axle kit apparatus, comprising, in combination:
an axle body component attachable and removable from a foldable sawhorse stand including:
a first axle body component threaded aperture at a first end of the axle body component for accepting a first spindle threaded end of a first spindle component,
a first spindle tightener component attachable around the first end of the axle body component for tightening the first spindle component securely to the first end of the axle body component,
a first axle body mounting pass-through aperture at a first location in the axle body component for attaching the axle body component to the foldable sawhorse stand at a first foldable sawhorse stand connection location,
a second axle body component threaded receptacle at a second end of the axle body component for accepting a second spindle threaded end of a second spindle component,
a second spindle tightener component attachable around the second end of the axle body component for tightening the second spindle securely to second end of the axle body component, and
a second axle body mounting pass-through aperture a second location in the axle body component for attaching the axle body component to the foldable sawhorse stand at a second foldable sawhorse stand connection location;
the first spindle component including the first spindle threaded end, a first spindle smooth middle component of a first width for accepting a first wheel of a first size and allowing the first wheel to spin freely around the first smooth component of the first width and a first stopper component at another end of the first spindle component for stopping the first wheel from sliding off the first spindle component,
the first spindle component attachable to and removable from, the axle body component with the first spindle threaded end, and
the first spindle component dynamically replaceable on the axle body component with another first spindle component with a different first spindle smooth middle component of another width for accepting another wheel of another size different than the first size of the first wheel;
the second spindle component including the second spindle threaded end, a second spindle smooth middle component of the first width for accepting a second wheel of the first size and allowing the second wheel to spin freely around the second smooth component of the first width and a second stopper component at another end of the second spindle component for stopping the second wheel from sliding off the second spindle component,
the second spindle component attachable to and removable from, the axle body component with the second spindle threaded end, and
the second spindle component dynamically replaceable on the axle body component with another second spindle component with a different second spindle smooth middle component of another width for accepting another wheel of another size different than the first size of the second wheel;
configuring the foldable sawhorse stand for moving by tipping the foldable saw horse from a horizontal position to a vertical position on the first wheel and the second wheel of the axle body component attached to the foldable sawhorse stand for wheeling and moving the foldable sawhorse to a new location.

2. The axle kit apparatus of claim 1, wherein a plurality of legs from the foldable sawhorse stand are included in an unfolded, open configuration.

3. The axle kit apparatus of claim 1, wherein a plurality of legs from the foldable sawhorse stand are included in a folded, closed configuration.

4. The axle kit apparatus of claim 1, wherein one or more tools are mounted to a top surface of the foldable sawhorse stand and the first wheel and the second wheel of the axle body component move the foldable sawhorse stand with the one or more mounted tools to the new location.

5. The axle kit apparatus of claim 4, wherein a plurality of legs from the foldable sawhorse are included in an unfolded, open configuration.

6. The axle kit apparatus of claim 1 wherein the first spindle threaded end of the first spindle component allows the first spindle component to be dynamically moved into and out of the axle body into new physical positions and locked into placed in the new physical positions by rotating the first spindle tightener component.

7. The axle kit apparatus of claim 1 wherein the second spindle threaded end of the second spindle component allows the second spindle component to be dynamically moved into and out of the axle body into new physical positions and locked into placed in the new physical positions by the rotating the second spindle tightener component.

* * * * *